Feb. 7, 1950 J. E. GALL 2,496,283
ELECTRONIC GENERATOR CIRCUIT
Filed July 14, 1945

Inventor
James E. Gall
By Ralph Chappell
Attorney

Patented Feb. 7, 1950

2,496,283

UNITED STATES PATENT OFFICE 2,496,283

ELECTRONIC GENERATOR CIRCUIT

James E. Gall, Washington, D. C.

Application July 14, 1945, Serial No. 605,158

9 Claims. (Cl. 315—24)

(Granted under the act of March 3, 1883, as amended April 30, 1928; 370 O. G. 757)

This invention is concerned with an improvement in radar indicating equipment and more particularly with a combined sweep generator and range marker circuit that may be used with advantage in such indicators.

In the present state of the art it is known to use in indicating equipment associated with radar apparatus separate and distinct vacuum tubes and circuits for generating the horizontal sweep trace of the cathode ray indicator tube and for generating range markers which are interposed upon such horizontal sweep trace. According to the present invention, the same vacuum tube is made to produce in addition to sweep output the further function of generation of range marks. As a result, necessity for the use of a separate tube to perform the function of sweep generation and of range marker generation is dispensed with.

Accordingly, one object of the present invention is to provide a circuit in which a single switch tube will perform the combined functions of sweep generator and range marker generator.

Another object of the invention is the provision of a combined sweep generator and range marker generator circuit whereby either positive or negative sweep voltages may be derived from a single tube simultaneously with the generation of a series of extremely narrow positive pulses suitable for use as range markers in response to a triggering impulse.

Other objects, features and advantages of the invention will be apparent from the following particular description of a preferred embodiment thereof taken in connection with the accompanying drawing, in which.

Figure 1:
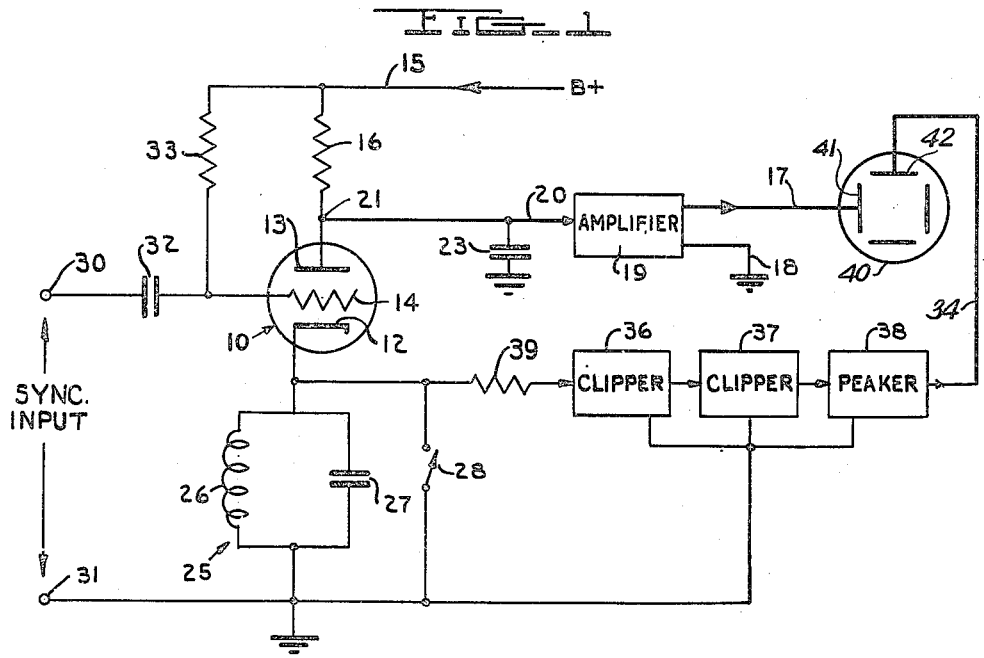
Fig. 1 represents one form of the present invention.

In the circuit of Fig. 1 the tube designated 10 is shown as a triode and may be of the type known as 6J5. This tube is provided with a cathode 12, an output or plate electrode 13 and a control grid 14. Plate-supply voltage (B+) from a suitable source of high potential (not shown) is supplied via line 15 through plate resistor 16 to the plate electrode 13. The sweep output at terminal 17 is the output obtained from the tube of the amplifier 19 which is coupled via line 20 to the plate 13, as at 21, and to the grounded capacitor 23 which is alternately charged and discharged when the tube 10 is alternately turned on and off.

Connected in series with the tube 10 and between the cathode 12 and ground is a parallel resonant circuit 25 frequently called an LC tank circuit and formed of the parallel combination of inductance 26 and capacitor 27. Switch 28 is placed in shunt with this L-C resonant circuit 25 for rendering said LC circuit ineffective when sweep output alone is desired. The synchronizing voltages are applied at input terminals 30 and 31, and impressed on the control grid 14 through coupling capacitor 32 series-connected to the control grid. The control grid 14 is returned to the plate-supply voltage line 15 through the resistor 33 of high resistance value. Capacitor 32 and resistor 33 form an R. C. circuit the effect of whose time constant affects both the sweep and range marker outputs. Since the sweep generator and the range marker generator employ a common R. C. coupling circuit in association with the switch tube there will be no time-delay in the functioning of the sweep and marker circuits to affect their output wave-shapes, as would be the case if separate R. C. circuits were employed when the tube is switched off and on by the input signals.

The marker-output is the voltage output at terminal 34 after clipping and peaking by clippers 36 and 37 and peaker 38 respectively of the damped oscillatory wave appearing across the L-C circuit 25. Resistor 39 is an isolating resistor coupling the clippers 36 and 37 and peaker 38 to the L-C circuit 25. Clippers 36 and 37 comprise a pair of overdriven amplifiers. Peaker 38 preferably is an LR peaker but, if desired, it may be an R. C. peaker instead.

The circuit further includes a cathode ray tube indicator 40 having horizontal deflection plates 41 and vertical deflection plates 42. The output of the amplifier 19 is connected to the horizontal deflection plates 41 through the terminal 17 to sweep the electron beam of the indicator 40, while the impulse output at the terminal 34 is applied to the vertical deflection plates 42 to periodically deflect the electron beam during the sweep thereof.

Figure 2:
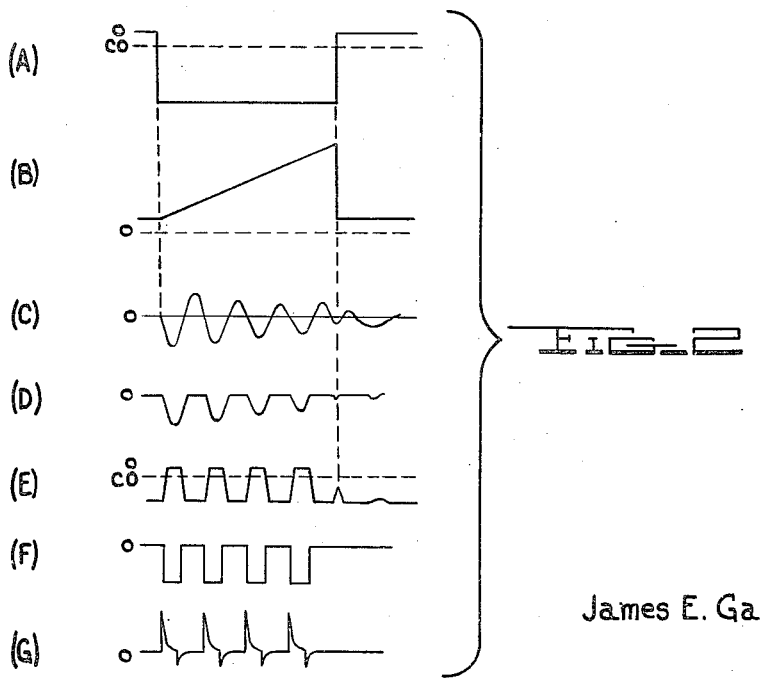
Fig. 2 shows a group of curves representing certain voltage waveforms which occur when the circuit operates.

The operation of the circuit is as follows:

Tube 10, which is in series with the L-C resonant circuit 25, is normally conducting so that current is flowing through the inductance 26. If a large negative voltage (see curve A of Fig. 2) is suddenly applied to the input terminals 30 and 31 and thence impressed through capacitor 32 to the control grid 14, tube 10 will be suddenly switched off thus stopping the flow of plate current through the tube. When this occurs, the voltage at the plate 13 rises exponentially toward B+ value due to the fact that capacitor 23 charges at an exponential rate thus providing the sawtooth waveform shown in curve B of Fig. 2 which is applied to the horizontal deflection plates 41 of the cathode ray tube indicator 40 to sweep the electron beam thereof. If switch 28 is open, the high Q parallel LC resonant circuit 25 will be shocked or excited into oscillation at the frequency of $$f = \frac{1}{T} = \frac{1}{2\pi\sqrt{LC}}$$

and the markers will appear at terminal 34 in the form of a damped sinusoidal wave train (see curve C of Fig. 2). The reason for this is that tube current flowing through the inductance 26 at the time that tube 10 is cutoff cannot be stopped instantaneously but continues thereafter to flow around the L-C circuit 25, thus charging capacitor 27. As capacitor 27 charges a voltage builds up across it the effect of which is to slowly retard the current flow in circuit 25 and finally bring it to a stop. Capacitor 27 then starts to discharge through inductor 26 of the L-C resonant circuit 25 to cause current flow therethrough in the reverse direction. This so-called "ringing" process of alternate charging and discharging of capacitor 27 is repeated cyclically, because of the cutoff status of plate current through tube 10 thereby resulting in a flow of oscillatory current in the L-C resonant circuit 25 with an oscillating voltage appearing across this circuit. These oscillations continue but decrease in amplitude at an exponential rate due to their energy being dissipated by the losses of the circuit. Thus, a damped sinusoidal wave (see curve C of Fig. 2) is developed by the L-C circuit 25 and the tube 10. This damped sinusoidal wave appearing across the L-C circuit is passed successively through resistor 39, clippers 36 and 37 and peaker 38, the waveform shown in curve G of Fig. 2 being the output at terminal 34 from the peaker 38 and in the form of a series of narrow pulses suitable for use as range markers. Because of grid clipping, by the resistor 39, the waveform shown in curve D of Fig. 2 appears at the control grid of the tube (not shown) of clipper stage 36. In that tube, plate-current cutoff clipping occurs so that the output wave applied to the grid of the tube (not shown) of clipper stage 37 as a positive voltage of the approximately square-wave form shown in curve E of Fig. 2. This positive square-wave is then amplified by the tube (not shown) of the clipper 37 and appears at the output as a negative voltage having the more evenly square-wave form shown in curve F of Fig. 2. This negative voltage waveform of curve F is applied to the grid of the tube (not shown) of the peaker stage 38 to render its tube alternately conducting and non-conducting whereby positive peaks of voltage are formed due to the action of the particular peaking circuit of peaker 38. In the case of an LR peaker, due to the inductance-resistance parallel circuit utilized in the plate supply circuit of peakers of this type, which is of a well-known construction in the art, the output voltage delivered by such an LR peaker will have the waveform shown in curve G of Fig. 2. The extremely narrow positive voltage peaks shown in curve G are applied to the vertical deflection plates 42 to deflect the electron beam during the sweep to thereby produce range markers on the sweep trace of a cathode ray indicator tube. When switch 28 is in a closed position, no markers will appear since the LC circuit 25 will be shorted out.

When the grid 14 of tube 10 is made more positive the tube starts conducting and during such conducting period capacitor 23 will discharge through tube 10 and resistor 16.

While tube 10 has been represented as a triode it is to be understood, of course, that other tube forms may be employed instead such as, for example, a pentode with the necessary modified circuit arrangements obvious when such a tube form is utilized.

If desired, the oscillatory voltage developed across the tank and produced by the shock excited oscillator portion of the above-described circuit for use in deriving range marks may be maintained at a constant amplitude, instead of being produced as a damped wave train, by employing positive feedback with the switch tube 10 and cathode follower action thereof.

While there has been described a preferred embodiment of the invention, it will be obvious to those skilled in the art that various changes and modifications may be made therein without departing from the spirit of the invention, and it is, therefore, to be distinctly understood that no limitations are intended other than are imposed by the scope of the appended claims and limited by the prior art.

The invention described herein may be manufactured and used by or for the Government of the United States of America for governmental purposes without the payment of any royalties thereon or therefor.

What is claimed is:

1. In an indicating system of the class described, a circuit for performing the combined functions of a sweep generator and a range-marker generator comprising an electron-discharge device having a cathode, an anode and a control electrode, an input circuit for applying a control pulse to said control electrode, circuit means coupled to the anode circuit of said tube for producing a sweep potential in synchronism with said control pulse, and a circuit connected in a cathode circuit of said tube resonant at a predetermined frequency for producing in synchronism with said control pulse a plurality of oscillations during the period of said sweep potential.

2. In an indicating system of the class described, a circuit for performing the combined functions of a sweep generator and a range-marker generator comprising an electron-discharge device having a cathode, an anode and a control electrode, an input circuit for applying control pulses to said control electrode, circuit means coupled to the anode circuit of said tube for producing sweep potentials in synchronism with said control pulses, a circuit connected in the cathode circuit of said tube resonant at a frequency for producing in synchronism with said control pulses a predetermined number of oscillations during the periods of said sweep potentials, an output circuit coupled to remove said oscillations for subsequent clipping and peaking operations to produce a series of narrow pulses suitable for use as range markers, and selectively operable means for rendering said resonant circuit ineffective so that the sweep potentials alone or both sweep potentials and oscillations may be obtained during operation of the circuit.

3. In an indicating system of the class described, a circuit for performing the combined functions of generating a cathode ray sweep potential and a series of marker pulses comprising an shock-excited oscillator circuit including an electron discharge device having a cathode, an anode and a control electrode, circuit means connected to the anode of said tube for producing a sweep potential in synchronism with a control signal applied to said control electrode, a resonant circuit connected in the cathode circuit of said tube tuned to a predetermined frequency for generating a series of oscillations during the period of said sweep potential and separate connections for removing the oscillations developed in said resonant circuit and for removing the sweep potential produced by said sweep circuit means.

4. In an indicating system of the class described, a circuit for performing the combined functions of a sweep generator and a range-marker generator comprising a normally conducting electron discharge device having a cathode, an anode and a control electrode, an input circuit for applying negative pulses to said control electrode for rendering said device non-conducting in accordance therewith, circuit means coupled to the anode circuit of said tube for producing sweep potentials during non-conducting periods of said device, and a circuit coupled to the cathode circuit of said device resonant at a frequency for producing in response to non-conducting periods of said device a predetermined number of oscillations during the periods of said sweep potentials.

5. In an indicator system, a cathode ray tube having horizontal and vertical deflecting means, sweep means applying a sweep potential to said horizontal deflecting means, impulse generator means for applying a plurality of impulses to said vertical deflecting means during the period of said sweep potential, an electron discharge device, and means coupling said sweep means and said impulse generator means to different circuits of said device so that said device simultaneously initiates operation of said sweep means and said impulse generator means in response application of a control signal thereto.

6. In an indicator system, a cathode ray tube including horizontal and vertical deflecting means, sweep means applying a sweep voltage to said horizontal deflecting means, a circuit resonant at a frequency to produce a plurality of oscillations during the period of said sweep voltage, means applying said oscillations to said vertical deflecting means, an electron discharge device responsive to an external signal source to synchronously shock-excite said resonant circuit and initiate operation of said sweep means, and means isolating the outputs of said sweep means and said resonant circuit, the last-named means including means coupling said sweep means and said resonant circuit to different circuits of said device.

7. In an indicator system, a cathode ray tube including horizontal and vertical deflecting means, sweep means applying a sweep voltage to said horizontal deflecting means, a shock-excited circuit resonant at a frequency to produce a plurality of oscillations during the period of said sweep voltage, means responsive to said oscillations to produce a plurality of impulses of short duration, means applying said impulses to said vertical deflecting means, and means including an electron discharge device and means coupling said sweep means and said resonant circuit to different circuits of said device for synchronously shock-exciting said resonant circuit and initiating operation of said sweep means in response to application of a control signal to said device.

8. In an indicator system, a cathode ray tube having horizontal and vertical deflecting means, a circuit for performing the combined functions of a sweep generator and a marker pulse generator comprising a shock-excited oscillator circuit including a normally conducting electron discharge device having an anode, a cathode and a control electrode, a tuned circuit in series with said device, sweep generator means connected to said anode, means responsive to oscillations developed in said tuned circuit to produce peaked pulses in response thereto, means applying the output of said sweep generator to said horizontal deflecting means, and means applying said peaked pulses to said vertical deflecting means, said tuned circuit adjusted to resonate at a predetermined frequency so that a plurality of pulses are produced during the period of said sweep.

9. In an indicating system, a cathode ray tube having horizontal and vertical deflecting means, sweep means applying a sweep potential to said horizontal deflecting means, impulse generator means applying a plurality of impulses to said vertical deflecting means during the period of said sweep potential, and an electron discharge device comprising a portion of said sweep means and said impulse generator means with said sweep means and said impulse generator means coupled to different circuits thereof for simultaneously initiating operation of said impulse generator means and said sweep means in accordance with a predetermined control signal.

JAMES E. GALL.

REFERENCES CITED

The following references are of record in the file of this patent:

UNITED STATES PATENTS

| Number | Name | Date |
| --- | --- | --- |
| 2,153,202 | Nichols | Apr. 4, 1939 |
| 2,241,256 | Gould | May 6, 1941 |
| 2,350,069 | Schrader et al. | May 30, 1944 |
| 2,426,989 | De Rosa | Sept. 9, 1947 |
| 2,431,324 | Grieg | Nov. 25, 1947 |
| 2,432,196 | Hershberger | Dec. 9, 1947 |
| 2,434,264 | Edson | Jan. 13, 1948 |

OTHER REFERENCES

Proc. I. R. E., Sept. 1940, pp. 406–409, Generation of Synchronizing Pulses by Impulse Excitation, by Sherman.